United States Patent [19]

Takaoka et al.

[11] Patent Number: 4,969,141
[45] Date of Patent: Nov. 6, 1990

[54] OPTICAL MEMORY FOR STORING AND RETRIEVING INFORMATION BY LIGHT EXPOSURE

[75] Inventors: Takashi Takaoka, Yokohama; Kiyoshi Tsuboi, deceased, late of Yokohama, by Yoko Tsuboi, heir, both of Japan

[73] Assignee: Kabushiki Kaisha Toshiba, Kawasaki, Japan

[21] Appl. No.: 339,656

[22] Filed: Apr. 18, 1989

Related U.S. Application Data

[60] Division of Ser. No. 298,298, Jan. 17, 1989, abandoned, which is a continuation of Ser. No. 170,697, Mar. 14, 1988, abandoned, which is a continuation of Ser. No. 767,643, Aug. 20, 1985, abandoned.

[30] Foreign Application Priority Data

Aug. 24, 1984 [JP] Japan .................................. 59-176276
Oct. 9, 1984 [JP] Japan .................................. 59-211964

[51] Int. Cl.$^5$ .............................................. G11B 7/24
[52] U.S. Cl. ..................................... 369/100; 369/288; 369/275.1; 430/945; 346/135.1; 346/762
[58] Field of Search ............... 369/100, 284, 286, 288, 369/275; 365/113; 346/135.1, 762, 137; 428/64, 65; 430/945, 270, 272

[56] References Cited

U.S. PATENT DOCUMENTS

| 4,425,570 | 1/1984 | Bell et al. ..................... 346/135.1 |
| 4,465,767 | 8/1984 | Oba et al. ..................... 346/135.1 |
| 4,499,178 | 2/1985 | Wada et al. ..................... 430/945 |
| 4,576,895 | 3/1986 | Barton et al. ..................... 430/270 |
| 4,614,951 | 9/1986 | Osato et al. ..................... 346/135.1 |
| 4,650,742 | 3/1987 | Goto et al. ..................... 346/135.1 |
| 4,816,840 | 3/1989 | Osato et al. ..................... 430/945 |

FOREIGN PATENT DOCUMENTS 59-60744 4/1984 Japan .................................. 369/288

Primary Examiner—Stuart S. Levy
Assistant Examiner—Hoa Nguyen
Attorney, Agent, or Firm—Foley & Lardner, Schwartz, Jeffery, Schwaab, Mack, Blumenthal & Evans

[57] ABSTRACT

An optical disc memory for optically storing and retrieving information formed of a substrate and a recording layer supported on the substrate. The recording layer has a chemically stable dielectric material and a semiconductor which has an optical property that changes reversibly as a function of the intensity of a laser beam applied through the substrate. A multilayered optical disc memory having a substrate, a recording layer formed on the substrate and a metallic layer formed on the recording layer, and a method of optically storing and retrieving information by using the above-described optical disc memory, are also disclosed.

3 Claims, 6 Drawing Sheets

OPTICAL MEMORY FOR STORING AND RETRIEVING INFORMATION BY LIGHT EXPOSURE

This application is a division of application Ser. No. 07/298,298, filed Jan. 17, 1989, which is a continuation of application Ser. No. 07/170,697, filed Mar. 14, 1988, which is a continuation of application Ser. No. 06/767,643, filed Aug. 20, 1985 all now abandoned.

BACKGROUND OF THE INVENTION

The present invention relates to an optical memory which is capable of storing and retrieving information by light exposure. More specifically, the invention relates to an optical recording disc comprising a recording layer that has optical property which changes when the layer is irradiated with a laser.

For storing and retrieving information, an optical disc comprising a layer or film of semiconductor materials is widely used in industrial and consumer recording systems such as video recorders, digital audio recorders and document digital recorders. A signal is recorded on the optical disc by applying a laser beam so that bits of information are formed in a layer of semiconductor materials. The optical disc permits direct read after write and random access to the recorded information.

Generally, a layer of semiconductor material, such as Se, Ge, Te and InSb, is well-known for its ability to assume two stable states, amorphous and crystalline. The concept of an optical memory based on the amorphous-to-crystalline transition of the semiconductor materials mentioned above is disclosed by S. R. Ovshinsky et al, "Reversible Structural Transformations in Amorphous Semiconductors for Memory and Logic," METALLURGICAL TRANS. 2:641–45 (1971). These semiconductor materials, however, are chemically unstable and are gradually corroded in the air when they are made into a thin film. Therefore, they are not used in practice as the recording film of an optical disc memory.

Since 1971, substantial effort has been expended to produce a durable recording film of semiconductor materials. For example, in "Reversible Optical Recording in Trilayer Structures" APPL. PHYS. LETT. 38:920–921 (1981), A. E. Bell et al disclose an erasable optical recording medium based on the amorphous-to-crystalline transition of pure tellurium. The optical recording disc of Bell et al includes silicon dioxide capping layers formed on the both sides of the tellurium film to protect the pure tellurium film from corrosion and to prevent the tellurium from evaporating. In the resulting trilayer structures, the thickness of each layer must be precisely controlled, making the film forming-process unduly complicated.

Another example of an optical disc is reported by M. Takenaga in *Proceedings of the 116th Study Meeting of No. 131 Film Conference of the Japan Society for the Promotion of Science*, May 20, 1983, at pp. 21–26. This optical disc is based on the reversible transition of a tellurium sub-oxide thin film which is formed as a deposition layer by simultaneous evaporation of $TeO_2$ and Te that contains Ge or Sn as an impurity. Therefore, it is difficult to control the quality of the film produced via the disclosed method, because the method includes decomposing unstable $TeO_2$ at a high temperature. Moreover, the tellurium sub-oxide thin film had a low reflectivity (about 15%) and a low rate of reflectivity change (about 12%), resulting in a low signal-to-noise (SN) ratio.

SUMMARY OF THE INVENTION

Accordingly, it is an object of the present invention to provide an improved optical memory wherein data can be optically stored and retrieved.

It is a further object of the present invention to provide an optical memory which is excellent in durability and has a high SN ratio.

It is still a further object of the present invention to provide a simple film-forming process for producing an optical memory as described above.

In accordance with the present invention, the foregoing objects, among others, are achieved by providing an optical memory comprising a substrate and a recording layer, supported on the substrate, which comprises a chemically stable dielectric material and a semiconductor material capable of undergoing a change in optical reflectivity when exposed to light.

In accordance with another aspect of the present invention, the above-stated objects are achieved by providing a method of storing and retrieving information comprising the steps of (a) providing a recording layer comprising a chemically stable dielectric material and a semiconductor material capable of undergoing a change in optical reflectivity when exposed to light, and (b) applying a light beam to selected portions of the layer to cause a structural change in the semiconductor material in the selected layer portions, whereby optical reflectivity in those portions is altered. In a preferred embodiment, the aforesaid method further comprises after step (b) the step of optically detecting the selected structural change in the selected portions of the recording layer.

There has also been provided, in accordance with yet another aspect of the present invention, a method for producing an optical memory element, comprising the step of co-evaporating a semiconductor material and a dielectric material onto a transparent substrate in a high vacuum to form on the substrate a recording layer comprising the semiconductor material and the dielectric material, the semiconductor material being capable of undergoing a change in optical reflectivity when exposed to light.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which.

DETAILED DESCRIPTION OF THE PREFERRED EMBODIMENTS

Figure 1:
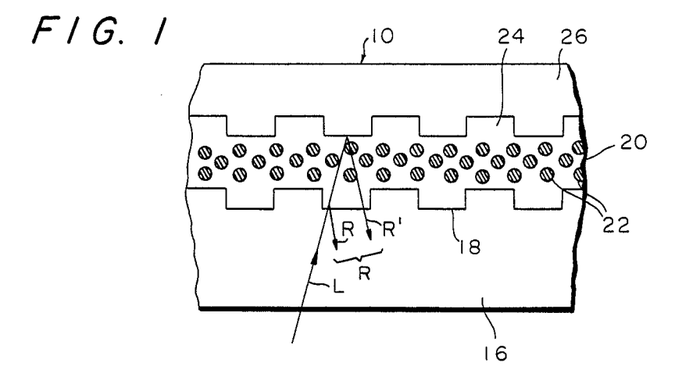
FIGS. 1 through 3 each provide a sectional view, respectively, of a different optical disc memory according to the present invention.
Figure 2:
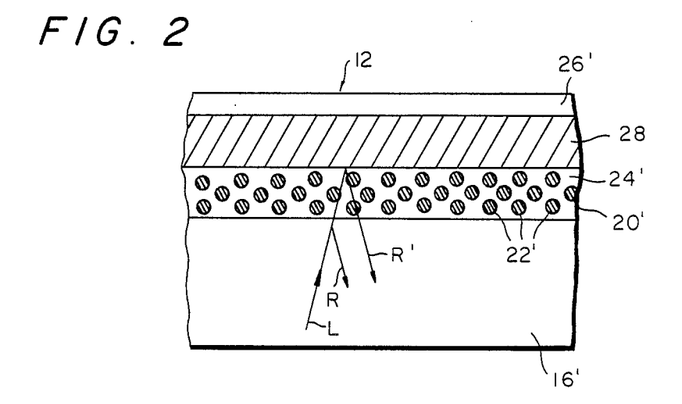
Figure 3:
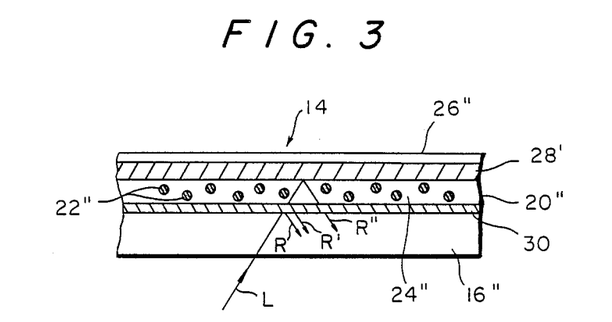

With reference to FIGS. 1, 2 and 3, optical disc memories are generally designated 10, 12 and 14, respectively. These optical discs can be used as a computer memory medium, an image recording medium for an image information filing system, and the like. The optical disc memories comprise a transparent substrate 16, 16' or 16", respectively. Substrates 16, 16' and 16" are formed from acrylic resins or polycarbonate resins, and each takes the form of a disc having a diameter of about 130 mm and a thickness of about 1.2 mm, which disc carries grooves 18 and can be rotated. Grooves 18, as shown in FIG. 1, are formed on the surface of substrate 16, 16' or 16"; they are about 0.07 /μm deep and about 0.8 /μm wide. Similar grooves, not shown, are also provided on the surface of substrate 16' or 16". Grooves 18 are used for optical tracking, in that portions to record or erase information are guided as a recording track by the grooves.

The optical disc has a recording layer or film 20, 20' or 20". The recording film comprises a chemically stable dielectric member 24, 24' or 24" wherein are dispersed discrete regions ("particles") of semiconductor material having a complex refractive index expressed as (n−ik), where n and k are real numbers. Generally, the refractive index of a transparent material such as a glass plate is defined by reference to a refraction angle. But the case of a material that absorbs light, such as a metallic layer, the refractive index is expressed in terms of complex number (n−nk), where n represents the difference between the speed of light in a vacuum and in the metallic layer, respectively, and k represents the absorption of light in the metallic layer. As disclosed by Stuke, "Review of Optical and Electrical Properties of Amorphous Semiconductors," J. NON-CRYSTALLINE SOLIDS 4:1-26, and described in greater detail below, the complex refractive index, and hence the optical reflectivity, of the semiconductor material changes as a function of a structural transition within the semiconductor particles of the recording layer.

The semiconductor material used in the present invention preferably has a fractional volume factor of about 40% or more, where fractional volume factor (q) is defined as the ratio of the volume of the semiconductor material in the recording layer to the total volume of the recording layer. Also, in the present description "chemically stable dielectric member" denotes a dielectric material that is effectively unreactive with the aforesaid semiconductor material and does not interfere with a light-modulated phase transistion within the semiconductor particles, as further detailed below.

In accordance with the present invention, a light beam is employed to heat semiconductor particles in selected regions of the recording layer. For example, recording film 20, 20' or 20" can be locally irradiated by a laser beam L for a certain time period T, the semiconductor particles 22, 22' or 22" are heated to a certain temperature t which is proportional to the energy density of laser beam L. After exposure to the laser beam is terminated, the heated semiconductor particles are cooled gradually, at a cooling speed of t/2T, as heat is lost from the particles by thermal conduction to the surrounding dielectric member. Although coherent light is used in the preceding example, incoherent light can be employed so long as beam intensity is sufficient to heat the semiconductor particles and effect the structural transition described below.

The semiconductor particles in the irradiated portions of the recording film are thus cooled quickly when heated by irradiation with a high power density beam for a short time and, conversely, are cooled slowly when heated by an irradiating beam of a lower power density for a longer time. Moreover, the semiconductor particles become amorphous in structure when they are heated by irradiation with a high power density beam for a short time and cooled quickly. Conversely, they enter a crystalline phase when they are heated by irradiation with a lower power density beam for a longer time and cooled slowly. The use of semiconductor particles for reversible recording is based on a transition in the structure of the particles which occurs when the particles are heated and, as a consequence, have different optical properties (i.e., reflectivity) characterized by the complex refractive index. More specifically, semiconductor particles 22, 22' or 22" contained in recording layer 20, 20' or 20" can undergo a temperature-dependent structural transition, governed by the selection of the exposure time and power density of laser beam L, between amorphous and crystalline phases which have differing complex refractive index. The reflectivity characterized by the complex refractive index of the irradiated portions in recording layer 20, 20' or 20" can be altered and information thereby recorded (or erased) as the localized change in the optical reflectivity of the recording layer.

A particularly preferred optical thickness for recording film 20, 20' or 20" is less than about one-half of the wave length of the applied laser beam, so that the intensity light reflected from the recording layer is enhanced by constructive interference between reflected rays R and R'. By virtue of this interference effect, recording film 20, 20' or 20" maintains a high reflectivity after recording and erasing information, and focusing, tracking and information signals are obtained with a high SN ratio. In this embodiment of the present invention, recording film 20, 20' or 20" comprises semiconductor particles 22, 22' or 22" dispersed in chemically stable dielectric member 24, 24' or 24", so that (1) semiconductor particles can easily change in structure from amorphous to crystalline phase, or vice versa, and (2) disc durability, which is an important feature for the optical disc memory of the present invention, is extremely improved.

In another embodiment of the present invention, the surface of optical disc memory 10, 12 and 14 is covered by a protective layer 26, 26' or 26", respectively, and thereby stabilized. This embodiment is particularly desirable because of its durability. The protective layer 26, 26' or 26" is fabricated by coating the surface of the optical disc memory with UV-curable resins and then curing the resins by ultraviolet irradiation.

With reference to FIG. 1, optical disc memory 10 comprises substrate 16, an overlying recording layer 20, and a protective layer 26 adjacent to the recording layer. Laser beam L is applied to recording layer 20 through transparent substrate 16 and reflected at both boundaries of the recording layer, so that the reflected light R is changed in its intensity according to the reflectivity of the recording layer.

With reference to FIG. 2, optical disc memory 12 comprises substrate 16', recording layer 20' formed on substrate 16', metallic layer 28 formed on recording layer 20' and protective layer 26' formed on metallic layer 28. Metallic layer 28 is comprised of Cu and has a high reflectivity. Recording layer 20' is irradiated by laser beam L through transparent substrate 16'. The impinging laser light is reflected at the surface of recording layer 20' and the surface of metallic layer 28, respectively, and the intensity of reflected light is changed as a function of the reflectivity of the recording layer. In this embodiment, metallic layer 28 is particularly desirable because of its high reflectivity. Such a structure assures a reading operation characterized by a high SN ratio, since constructive interference between reflected rays R, R' and R" enhances signal intensity.

With reference to FIG. 3, optical disc memory 14 has a semitransparent metallic layer 30 comprised of Cu which is interposed between substrate 16" and recording layer 20". The optical disc memory also has a metallic layer 28' which is similar to metallic layer 28 shown in FIG. 2. Thus, in this embodiment optical disc memory 14 comprises substrate 16", semitransparent metallic layer 30 formed on substrate 16", recording layer 20" formed on semitransparent metallic layer 30, metallic layer 28' formed on recording layer 20" and protective layer 26" formed on metallic layer 28'. Recording layer 20" is exposed to laser beam L through substrate 16" and semitransparent metallic layer 30, so that the light R is reflected at the surfaces of semitransparent metallic layer 30, recording layer 20" and metallic layer 28', respectively. As a result, the reflected light is changed in its intensity according to the reflectivity of recording layer 20". This multilayer structure enables the intensity of the reflected light R to be twice that of optical disc 12 shown in FIG. 2, because of an interference effect involving rays reflected, respectively, by the multiple layers.

Semiconductor materials such as Ge, Te, Se, and InSb are well-known for their ability to assume two different phases (amorphous and crystalline) according to the manner of heating. Any semiconductor capable of a temperature-sensitive amorphous-to-crystalline transition can be used in the present invention. Moreover, dielectric materials that are suitable for the present invention must have sufficient chemical stability, as defined above, to prevent semiconductor materials from evaporating and corroding. For example, oxides, such as $B_2O_3$, $Sb_2O_3$, PbO, $SiO_2$ and $Ta_2O_5$, and fluorides, such as $BiF_3$, LiF, $PbF_2$, $MgF_2$, $BaF_2$ and $CaF_2$, are suitable for the dielectric member of the present invention.

The fractional volume factor of semiconductor particles in the present invention is preferably more than about 40% of the mixture of semiconductor materials and dielectric materials, and particularly is in the range of about 40 to 80%, to obtain sufficient reflectivity and durability for the optical disc memory. By preparing the mixture mentioned above, the recording layer works satisfactorily as an optical interference film although semiconductor materials generally have a high absorbancy.

Methods based on vacuum evaporation, sputtering and the like can be used to prepare both the recording layer and the metallic layer of the present invention. For example, a multilayered structure as described above is achieved using the coevaporating apparatus shown in FIG. 4. A deposition chamber 32 contains substrate 16, 16' or 16" which is supported by a supporting member 34 and rotated by a motor 36. Disposed below supporting member 34 are heaters 38, 40 and 42 for heating the material to be deposited. In the illustrated apparatus, heaters 38, 40 and 42 heat semiconductor material, dielectric material and metal, respectively. These heaters are charged and controlled by a power source 44. Deposition chamber 32 is connected to a vacuum pump 46 so that the deposition chamber can be evacuated to a pressure of about $10^{-3}$ Pa.

Figure 4:
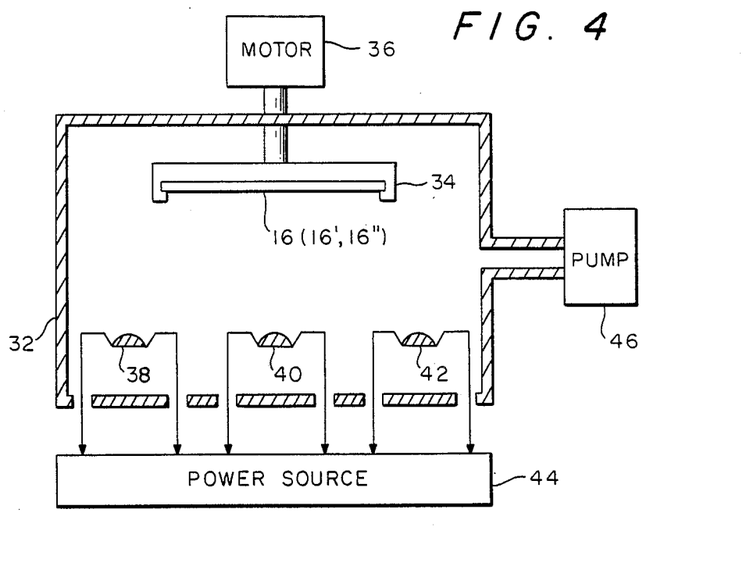
FIG. 4 is a schematic diagram depicting a co-evaporation system for use in preparing an optical disc memory with the present invention.

Cleaned substrate 16, 16' or 16" is thereafter fixed to supporting member 34, with the cleaned surface kept downward, and is rotated by motor 36. Pump 46 is then operated so as to bring the pressure of deposition chamber 32 down to about $10^{-3}$ Pa. Then heaters 38, 40 and 42 heat the materials to a predetermined temperature, whereby the heated materials are evaporated and deposited. Power source 44 controls the thickness of the deposited film and the proportion of mixed materials. Generally, the metallic layer is deposited after the deposition of the recording layer. Adjusting the thickness of the metallic layer renders the layer reflective (by increasing layer thickness) or semitransparent (by making the layer thinner). A particularly preferred example of a metallic layer within the present invention is a high reflectivity thin film comprising Au, Ag, Cu or Al and having a thickness of about 0.05 /$\mu$m or more. A semitransparent metallic film comprising Au, Ag, Cu or Al and having a thickness of about 0.01 /$\mu$m or less is suitable for use as a semitransparent layer in accordance with the present invention.

After the completion of the deposition, a valve (not shown) is opened to break the vacuum in deposition chamber 32. The prepared disc is removed from the apparatus and coated with a UV-curable resin, which forms the protective layer upon being irradiated with UV light.

The present invention will be described further with reference to the following examples, which should not be considered as limitations on the present invention.

EXAMPLE 1

In accordance with the procedure described below, an optical disc memory of the present invention was prepared by using an apparatus as shown in FIG. 4.

A substrate comprising polycarbonate resins was provided in the form of a disc having a diameter of about 130 mm and a thickness of about 1.2 mm and carrying grooves thereon of 0.07 /$\mu$m in depth and 0.8 /$\mu$m in width. The substrate was cleaned and fixed to supporting member 34. Then, the substrate was rotated and heaters 38 and 40 were operated while a high vacuum (about $10^{-3}$ Pa) was maintained inside deposition chamber 32. Heater 38 heated Ge (for the semiconductor particles) and heater 40 heated $Bi_2O_3$ (for a dielectric material member). A recording layer comprising a mixture of Ge and $Bi_2O_3$ was formed by simultaneously evaporating Ge and $Bi_2O_3$ onto the substrate, such that the fractional volume factor of Ge in the whole recording layer was adjusted via power source 44 to about 60%.

Figure 5:
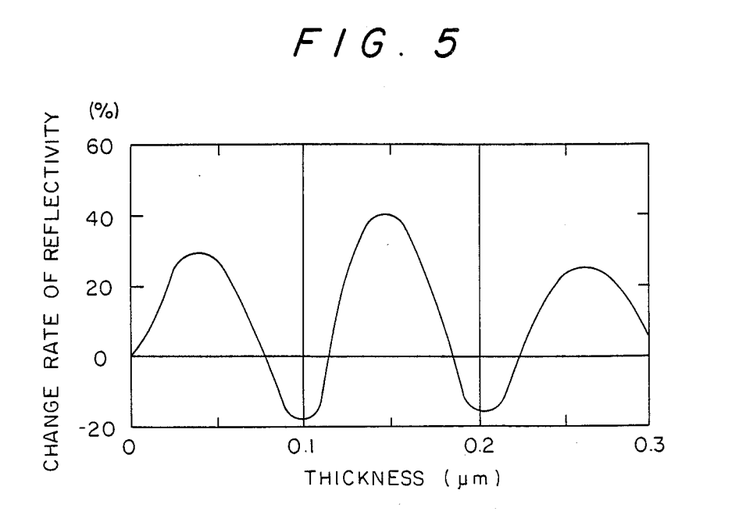
FIGS. 5, 9 and 10 are graphs showing, respectively, the relationship between the rate of reflectivity change and the thickness of recording films of the present invention.

The disc was covered with a protective layer made of UV-cured resin, so that it had a multi-layered structure as shown in FIG. 1. The resulting optical disc displayed an optical reflectivity that changed upon exposure of the disc to a laser beam having a wavelength of 0.83 /μm. As shown in FIG. 5, when the recording layer was exposed by the laser beam with wavelength of 0.83 /μm and the phase of the recording layer was thereby irreversibly switched from amorphous to crystalline, or vice versa, the observed rate of reflectivity change depended on the thickness of the recording layer. Disc reflectivity was likewise a function of the thickness of the recording layer, as shown in FIG. 6.

Figure 6:
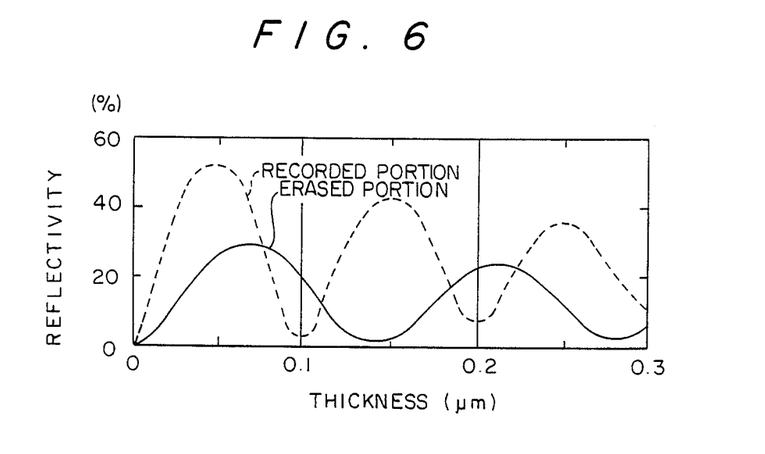
FIGS. 6 and 8 are graphs both showing the relationship between the reflectivity and the thickness of recording films of the present invention.

The results illustrated in FIGS. 5 and 6 indicate that the thickness of the recording layer should be about 0.05 /μm, i.e., in the range where disc reflectivity and reflectivity change-of-rate underwent significant alteration in response to exposure depending on the above-mentioned optical interference effect, and strong read-out signals were obtainable.

EXAMPLE 2

An optical disc was prepared as described in Example 1, except that InSb was used for the semiconductor material and PbO for the dielectric material. In addition, the thickness of the recording layer was adjusted to 1 /μm, and no protective layer was employed.

Figure 7:
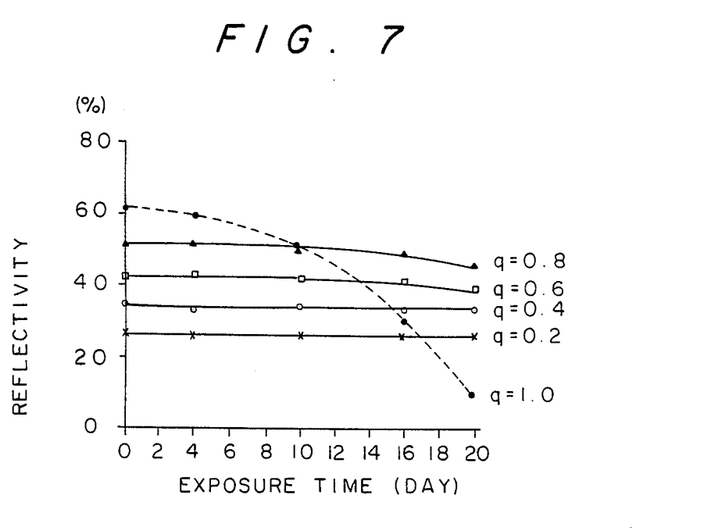
FIG. 7 is a graph showing the relationship between the reflectivity of a recording film of the present invention and exposure time.
Figure 8:
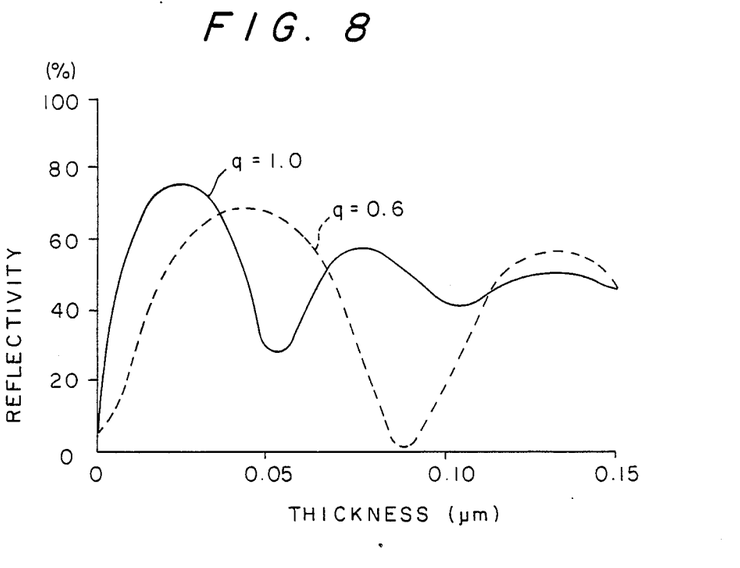

To test durability, the optical disc thus obtained was exposed to high temperature and humidity conditions. As shown in FIG. 7, the results indicated that fractional volume factor q of about 0.4 to 0.8 was associated with superior durability and reflectivity characteristics. When the recording layer comprising InSb and PbO was scanned by a laser beam of 0.83 /μm wavelength, the reflectivity of the recording layer was observed to be a function of both the thickness of the recording layer and the fractional volume factor q of InSb (see FIG. 8).

Accordingly, the value for fractional volume factor q is preferable selected between about 0.4 (40%) to 0.8 (80%). If this condition is satisfied, semiconductor material having a high absorbancy works satisfactorily as a constituent of an optical interference film also comprising a suitable dielectric material. Moreover, the optical interference of reflected light at the both boundaries of the recording layer can be increased because of the reduction of absorbancy associated with the reduced fractional volume factor q.

EXAMPLE 3

An optical disc was prepared as in Example 2, using the apparatus illustrated in FIG. 4. More specifically, a polycarbonate, disc-shaped substrate having a thickness of about 1.2 mm and a diameter of about 130 mm was cleaned and fixed to supporting member 34. The substrate was then rotated and heaters 38 and 40 were operated while the inside of deposition chamber 32 was kept at a high vacuum. Heaters 38 and 40 heated InSb for semiconductor particles and PbO for a dielectric member, respectively. Thus a recording layer comprising a mixture of InSb and PbO was deposited on the substrate by simultaneously evaporating InSb and PbO, such that the fractional volume factor of InSb in the whole recording layer was adjusted to about 60% via power source 44. Also, the thickness of the recording layer was similarly adjusted to between about 0.01–0.15 /μm.

Heaters 38 and 40 were then deenergized and heater 42 was operated to heat Cu. As a result, a metallic layer having a thickness of about 0.05 /μm was formed on the recording layer. After completion of the Cu deposition, the substrate was removed from the apparatus and was coated with UV-curable resins; a protective layer was thereafter formed on the metallic layer by irradiating the resin coating with UV light.

Figure 9:
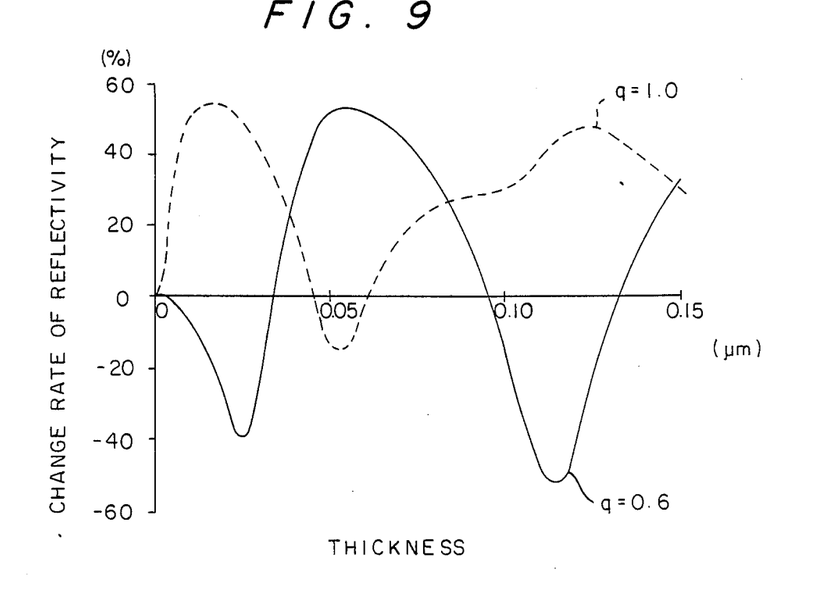

The resulting optical disc displayed an optical reflectivity that changed upon exposure of the disc to a laser beam having a wavelength of about 0.83 /μm. As shown in FIG. 9, the disc also showed a rate of reflectivity change that depended on the thickness of the recording layer. In light of the data shown in FIG. 9, the thickness of the recording layer was preferably about 0.055 /μm.

In FIG. 9, the dotted line represents the case when fractional volume factor q was 1.0, that is, the recording layer consisted essentially of InSb. The curves for q=1.0 and q=0.6, respectively, show almost the same rate of reflectivity change, i.e., strong read-out signals were obtained with the multi-layered disc construction even when InSb content was reduced from 100% to about 60%.

To obtain the multilayered structure shown in FIG. 2, the recording layer is formed by simultaneous sputtering, whereby discrete semiconductor regions are dispersed within the chemically stable dielectric member. The semiconductor regions dispersed in the recording layer can easily change to amorphous or crystalline phase, and the important feature of recording layer durability is dramatically enhanced. The deposition of the metallic layer by sputtering also makes the fabrication operation simple.

EXAMPLE 4

An optical disc was prepared as described in the Example 3, except that the fractional volume factor of InSb was established at about 90% and Se was used as a dielectric material member. In addition, Al was used instead of Cu for the metallic layer. Thus, a recording layer comprised of InSb and Se was deposited on the substrate, and a metallic layer of Al was deposited on the recording layer. Next, a protective layer was applied so that the resulting optical disc had the multilayered construction shown in FIG. 2. The thickness of the recording layer was in the range of about 0.04–0.08 /μm, and the thickness of the metallic layer was about 0.05 /μm. The Se dielectric material was effectively transparent to the impinging laser beam, which had a wavelength of about 0.83 /μm.

The resulting multilayer optical disc underwent an amorphous-to-crystalline phase transition upon irradiation with the laser beam, and a large rate of reflectivity change was observed in conjunction with the phase transition. Furthermore, the durability of the recording layer was extremely improved.

EXAMPLE 5

An optical disc was prepared as described in Example 3, except that Te and SiO were used for the semiconductor particles and the dielectric member, respectively. The resulting optical disc included a recording layer comprising a mixture of Te and SiO deposited on the substrate, with a metallic layer of Cu deposited on the recording layer and a protective layer coated on the metallic layer.

The thickness of the recording layer was in the range of about 0.03–0.06 /μm and the metallic layer had a thickness of about 0.05 /μm. The fractional volume factor of Te was adjusted to about 80%.

The above-described optical disc showed a amorphous-to-crystalline phase transition modulated by the intensity of the applied laser beam, and also had a large rate of reflectivity change associated with the phase transition.

EXAMPLE 6

In the manner of Example 1, an optical disc memory was prepared, using the apparatus shown in FIG. 4. A polycarbonate, disc-shaped substrate having a thickness of about 1.2 mm and a diameter of about 130 mm, and carrying grooves for optical tracking, was cleaned and fixed to supporting member 34. The substrate was then rotated, and heater 42 operated to heat Cu, while the inside of chamber 32 was kept at a high vacuum of $10^{-3}$ Pa. A semitransparent metallic layer having a thickness of about 0.01 /μm was thereby deposited on the substrate. Heater 42 was then deenergized and heaters 38 and 40 were charge to heat InSb and PbO, respectively, so that a recording layer comprising a mixture of InSb and PbO was deposited on the semitransparent metallic layer. The value of the fractional volume factor for InSb was adjusted to about 60% via power source 44. The thickness of the recording layer was in the range of about 0.01–0.15 /μm. Heaters 38 and 40 were then deenergized and heater 42 was operated to heat Cu for depositing a second metallic layer, having a thickness of about 0.05 /μm or more, on the recording layer. Finally, a protective layer was coated on the second metallic layer.

Figure 10:
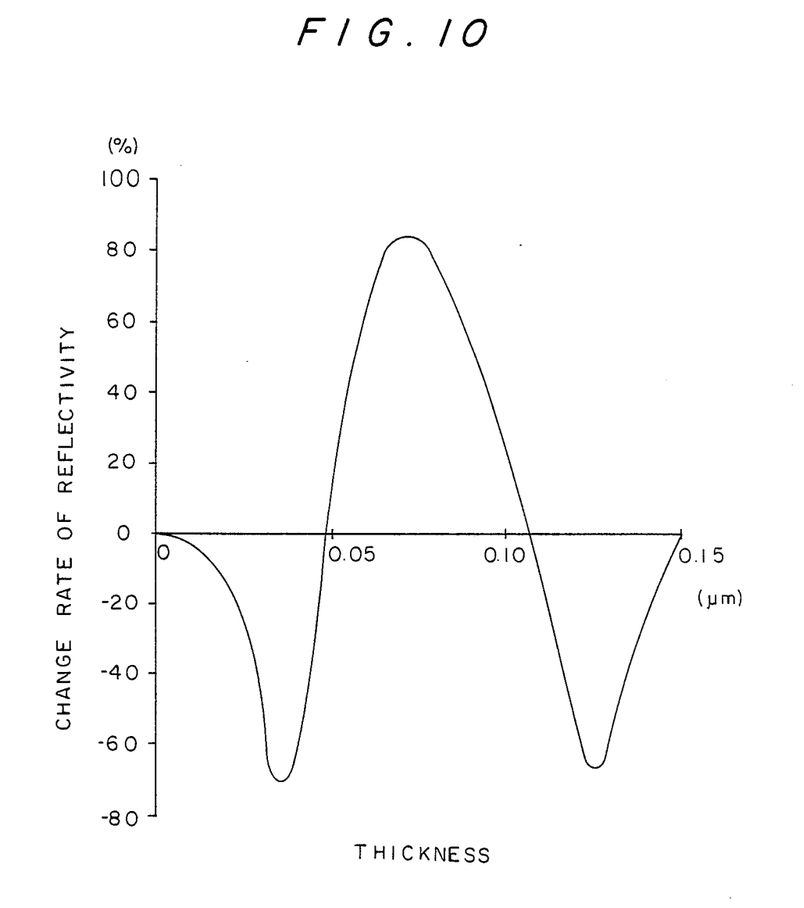

The resulting optical disc displayed an optical reflectivity which changed when the disc was irradiated with a laser beam having wavelength of 0.83 /μm. As shown in FIG. 10, the disc also showed a large rate of reflectivity change which was a function of recording layer thickness. Based on the results illustrated in FIG. 10, the thickness of the recording layer was preferably about 0.07 /μm.

The optical disc described above had a rate of reflectivity change of about 80% or more, owing to the multilayered construction shown in FIG. 3, i.e., to the optical interference effect of multipath reflection of light. Such a large rate of reflectivity change permits one to regenerate information, recorded on the recording layer as the portions of different phases, with a high SN ratio.

Figure 11:
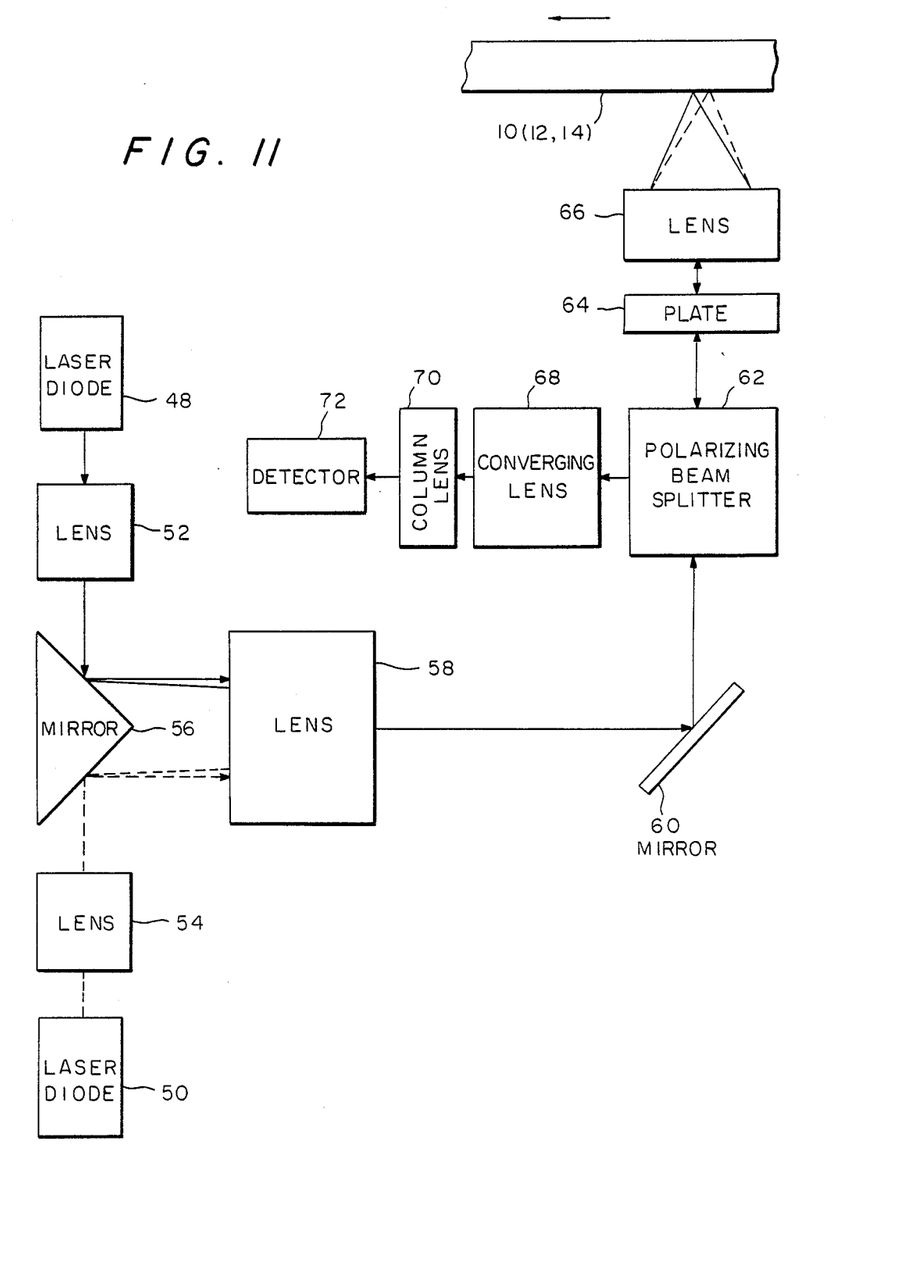
FIG. 11 is a schematic diagram of an optical disc memory system within the present invention.

The optical disc described in the foregoing examples is used for an image recording medium for an image information filing apparatus as shown in FIG. 11. The apparatus of FIG. 11 comprises a semiconductor laser diode 48 for reading and recording information and a semiconductor laser diode 50 for erasing information recorded on the disc. The laser beam emitted from diode 48 or 50 is focused by a lens 52 or 54, respectively, and reflected by a mirror 56. The light reflected from mirror 56 enters a lens 58 and then is reflected by a mirror 60. The reflected laser beam from mirror 60 is introduced to a polarizing beam splitter 62 and then to a plate 64 having a thickness such that the laser beam is retarded by one-quarter the wavelength of the applied laser beam. The laser beam enters then a lens 66 and is thereby focused on the optical disc. Lens 66 is movably supported by a driving mechanism (not shown) to adjust radially and axially the position of lens 66. Optical disc 10, 12 or 14 is rotated at a velocity of 10 m/s.

The light reflected from the optical disc enters lens 66 again and passes plate 64. At this time, the polarization plane of the light is changed by 90° because the light moves back and forth within plate 64, so that the light is reflected by polarizing beam splitter 62 and deflected to a converging lens 68 and a column lens 70. The reflected light from the optical disc is detected by a detector 72. Lens 66 is moved by the driving mechanism so that the converged spot from lens 66 focuses on the desired groove of the optical disc, i.e., the recording track is traced in response to the output signal of detector 72.

The laser diode emits the 0.83 /μm wavelength laser beam in 0.15 /μS pulses of about 7 mW in power when a recording operation is effected. In an erasing operation, the diode emits the beam in a 1.3 /μS pulse of lower power, i.e., about 4 mW.

When an optical disc memory of the present invention, which can have a multilayered structure as described in Example 3, is placed in the apparatus shown in FIG. 11 and a reading operation is carried out, laser diode 48 continuously emits a laser beam having one-third the power of a recording operation. The emitted light passes through the substrate and is reflected at both boundaries of the recording layer and the metallic layer, respectively. The intensity of the reflected light changes according to the reflectivity of the recorded portion, where the structure of the semiconductor particles has been switched to amorphous phase. Thus, the recorded information is regenerated as a change of reflectivity. In an erasing operation, laser diode 50 continuously emits an erasing beam to which the optical disc is exposed, whereby the structure of the semiconductor particles is switched to crystalline phase and the recorded information is consequently erased. In a recording operation, laser diode 50 works continuously and laser diode 48 emits pulsed light which contains information, so that the portions of the recording layer irradiated by the erasing beam and containing semiconductor particles in the crystalline phase are then switched to amorphous phase by the recording beam. The converged spot of the recording beam is smaller than that of the erasing beam and is guided on the recording track behind the spot of erasing beam, so that the operations of recording and erasing are executed simultaneously.

According to the present invention, the semiconductor material is stabilized within the recording layer, even if the disc is broken in the handling, assuring safety. Moreover, the recording layer may be easily deposited by the above-described co-evaporating method, so that optical disc memories of uniform quality and moderate price can be produced. As described above, it is possible with the present invention to provide an improved optical memory that can optically, reversibly store and retrieve information, is excellent in durability, has a high contrast ratio, and can be prepared using a simple film-forming process.

Numerous modifications and variations of the present invention are possible in light of the above teachings. It is therefore to be understood that, within the scope of the appended claims, the present invention can be practiced in a manner other than as specifically described herein.

What is claimed is:

1. An optical memory comprising:

(a) a transparent substrate (b) a semitransparent metallic layer supported on said transparent substrate, said semitransparent metallic layer comprising at least one material selected from the group consisting of Au, Ag, Cu and Al and having a layer thickness of between 0.01 $\mu$m and less than about 0.03 $\mu$m;

(c) a recording layer supported on said semitransparent metallic layer, said recording layer comprising a chemically stable dielectric material and a semiconductor material capable of undergoing a reversible phase transition between amorphous structure and crystalline structure when exposed to light; and (d) a reflective metallic layer supported on said recording layer, such that light passing through said transparent substrate, said semitransparent metallic layer and said recording layer is reflected by said reflective metallic layer, said reflective metallic layer comprising at least one material selected from the group consisting Au, Ag, Cu and Al and having a thickness of about 0.05 $\mu$m or more.

2. An optical memory as claimed in claim 1, further comprising a protective layer provided on said reflective metallic layer.

3. An optical memory as claimed in claim 1, wherein said light is a laser beam.

* * * * *